United States Patent
Lee et al.

(10) Patent No.: US 10,091,110 B2
(45) Date of Patent: Oct. 2, 2018

(54) EDGE-BASED LOAD SHEDDING SYSTEM FOR FAST DATA ANALYSIS AND OPERATING METHOD THEREOF

(71) Applicant: ELECTRONICS AND TELECOMMUNICATIONS RESEARCH INSTITUTE, Daejeon (KR)

(72) Inventors: Yong Ju Lee, Daejeon (KR); Ok Gee Min, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 175 days.

(21) Appl. No.: 15/227,583

(22) Filed: Aug. 3, 2016

(65) Prior Publication Data
US 2017/0126568 A1 May 4, 2017

(30) Foreign Application Priority Data

Oct. 28, 2015 (KR) .................. 10-2015-0150504
Jul. 5, 2016 (KR) .................. 10-2016-0084537

(51) Int. Cl.
*H04L 12/26* (2006.01)
*H04L 12/801* (2013.01)
*H04L 29/08* (2006.01)

(52) U.S. Cl.
CPC .......... *H04L 47/12* (2013.01); *H04L 43/0882* (2013.01); *H04L 67/303* (2013.01)

(58) Field of Classification Search
CPC .... H04L 47/12; H04L 43/0882; H04L 67/303
USPC .......... 370/229–238, 250–253; 455/450–453
See application file for complete search history.

(56) References Cited

U.S. PATENT DOCUMENTS

| | | | |
|---|---|---|---|
| 8,819,187 B1 * | 8/2014 | Hofmann | H04L 67/2814 709/217 |
| 9,419,852 B1 * | 8/2016 | Heller | H04L 29/08576 |
| 2008/0092058 A1 * | 4/2008 | Afergan | H04L 67/303 715/745 |
| 2011/0302269 A1 * | 12/2011 | Keene | H04L 67/2823 709/217 |
| 2012/0278463 A1 | 11/2012 | Ryu et al. | |
| 2014/0040504 A1 * | 2/2014 | Gupta | H04W 4/70 709/244 |
| 2014/0153390 A1 * | 6/2014 | Ishii | H04W 28/0289 370/230 |
| 2014/0297826 A1 * | 10/2014 | Park | H04L 41/0853 709/223 |

(Continued)

FOREIGN PATENT DOCUMENTS

KR  10-2012-0122136 A  11/2012

*Primary Examiner* — Thai Hoang (57) ABSTRACT

Provided is an edge-based load shedding system. The edge-based load shedding system includes an analysis server configured to determine to perform server or edge separation execution, transmit an operational module of an analysis application, issue a request to offload the transmitted operational module, and receive and analyze data obtained through preprocessing and an edge machine configured to receive and offload the operational module from the analysis server, preprocess raw data collected from a sensor by using the offloaded operational module, and transmit the data obtained through the preprocessing to the analysis server.

11 Claims, 9 Drawing Sheets

(56) References Cited

U.S. PATENT DOCUMENTS

| | | | |
|---|---|---|---|
| 2015/0124615 A1* | 5/2015 | Spector | H04L 47/22 370/235 |
| 2015/0207840 A1 | 7/2015 | Lee et al. | |
| 2015/0358401 A1* | 12/2015 | Flavel | H04L 67/1095 370/235 |
| 2017/0064609 A1* | 3/2017 | Park | H04L 12/189 |
| 2017/0094025 A1* | 3/2017 | Gupta | H04L 67/34 |
| 2017/0302752 A1* | 10/2017 | Heller | H04L 67/2823 |

* cited by examiner

EDGE-BASED LOAD SHEDDING SYSTEM FOR FAST DATA ANALYSIS AND OPERATING METHOD THEREOF

CROSS-REFERENCE TO RELATED APPLICATIONS

This application claims priority under 35 U.S.C. § 119 to Korean Patent Application No. 10-2015-0150504, filed on Oct. 28, 2015 and Korean Patent Application No. 10-2016-0084537, filed on Jul. 5, 2016, the disclosure of which is incorporated herein by reference in its entirety.

TECHNICAL FIELD

The present invention relates to a load shedding method based on server/edge separation execution for fast data analysis. Internet of things (IoT) denoting a connection between a thing and another thing instead of a connection between a person and another person is attracting much attention, and data generated from a number of systems connected to each other over a network rapidly advance into a fast data environment above big data.

Such a fast data environment, unlike the big data, has a feature where collected data are loaded at a high speed, and an analysis result is provided as a response at a high speed in real time or semi-real time. Various methods are being researched for stream data processing necessary for high speed data processing.

The present invention relates to an edge-based data filtering method for faster analyzing an application in a high speed stream data processing operation.

BACKGROUND

Recently, as a number of distributed applications are used, a persisting information flow is generated from a distributed system. For example, examples of a representative information flow include network traffic data which are used for an intrusion detection system, sensor network data, stock quotations data, and the like. In order to obtain useful information from an information flow, the useful information should be persistingly processed. However, in a conventional database management system (DBMS), since data should be stored and an operation of generating an index should be performed before obtaining information, it is difficult to satisfy these requirements sufficiently. Alternatively, a data stream management system (DSMS) has been proposed, and thus, a system capable of stream processing in a flow of continuously provided data is being widely used.

In terms of characteristic of sensor data, it is difficult to directly apply general raw data to an analysis application, an initial preprocessing operation of processing, refining, and loading raw data should be previously performed.

In conventional load shedding technology, load shedding is performed by ignoring some loads in consideration of network traffic and resources of a server, but since some input data which are helpful to operate a system stably but become an analysis target are ignored, an accuracy of an analysis result is reduced.

SUMMARY

Accordingly, the present invention provides an edge-based load shedding method in which an edge machine for collecting sensor data performs a preprocessing operation included in a whole processing operation of an analysis application.

The present invention also provides an edge-based adaptive load shedding method in which a load of an analysis server is reduced by using a method in which an operational module corresponding to a preprocessing operation among operational modules which is included in an analysis application based on a flow of input data is offloaded into an edge machine according to an input load and the operation module offloaded into the edge machine processes input data, instead of a passive method of automatically reducing an input load when the input load increases, unlike a general load shedding method.

The present invention also provides a method which provides a method, which increases a processing efficiency of data analysis software by applying distributed processing technology, as a method capable of preferentially being applied before loading previous input data for data analysis into an analysis application according to a trend where a big data environment changes to a fast data environment.

The object of the present invention is not limited to the aforesaid, but other objects not described herein will be clearly understood by those skilled in the art from descriptions below.

In one general aspect, an edge-based load shedding system includes: an analysis server configured to determine to perform server or edge separation execution, transmit an operational module of an analysis application, issue a request to offload the transmitted operational module, and receive and analyze data obtained through preprocessing; and an edge machine configured to receive and offload the operational module from the analysis server, preprocess raw data collected from a sensor by using the offloaded operational module, and transmit the data obtained through the preprocessing to the analysis server.

In another general aspect, an operating method of an edge-based load shedding system, which includes an analysis server analyzing raw data preprocessed by the edge machine and one or more edge machines collecting and processing the raw data from a sensor to transmit data obtained through the processing to the analysis server, includes: by the analysis server, (1) generating profile information about operational modules included in an analysis application; (2) collecting resource information and network information about the analysis server; (3) collecting resource information about the one or more edge machines; (4) determining to perform server or edge separation execution, based on the profile information, the resource information and the network information about the analysis server, and the resource information about the one or more edge machines; (5) determining edge machine for offloading and an operational module which is to be offloaded; (6) transmitting the operational module, which is to be offloaded, to the edge machine for offloading; and (7) issuing an offloading request to the edge machine for offloading.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, embodiments of the present invention will be described in detail with reference to the accompanying drawings.

Figure 1:
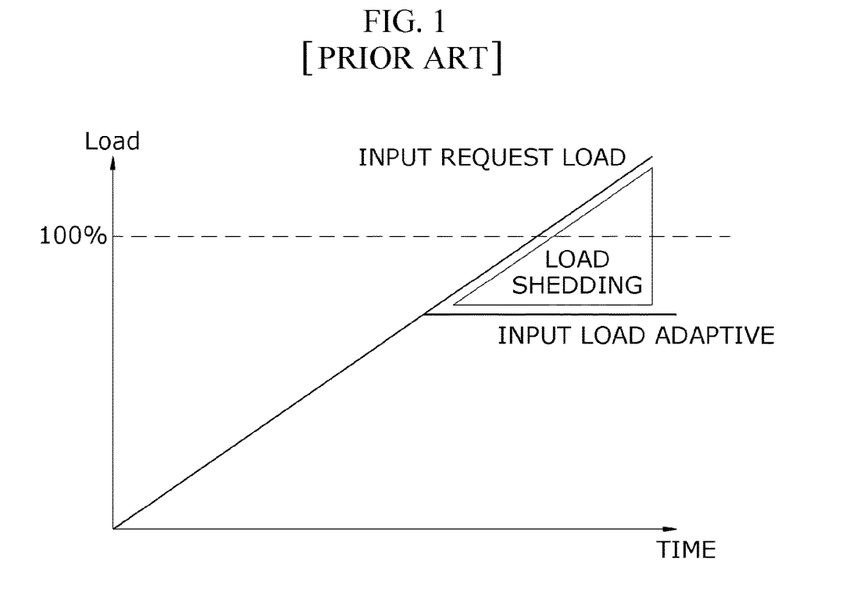
FIG. 1 is an exemplary diagram for describing a load reducing method in a system to which a load shedding method is applied.

FIG. 1 is an exemplary diagram for describing a load reduction method in a system to which a load shedding method is applied.

Load shedding may be a method how a load is automatically reduced by discarding the input data appropriately, in a data stream management system (DSMS), when input data increases and thus a data input rate is high compared to a limitation load capable of being processed by a processing engine.

As illustrated in FIG. 1, a server where an input request load increases with time may be assumed. When a certain time elapses, a load may reach 100%. When the load actually reaches 100%, the server cannot normally operate, and thus, when the load reaches a certain level, the load shedding method may be applied. The load shedding method may be referred to as an input load adaptive load shedding method. Therefore, some data may be ignored by the load shedding method, and thus, an input load level may be maintained as a certain level.

Here, the load may be a value which is determined based on network traffic, central processing unit (CPU) performance, a memory capacity, and/or the like, and when only one arbitrary load reaches 100%, the server cannot normally operate irrespective of other factors. The load shedding (load reducing) method has a drawback where some input data are ignored, but even when a load input to the server is high, the server may normally operate.

In the load shedding method according to an embodiment of the present invention, an analysis server 210 may measure network resources and resources of the server in real time, and when a load is equal to or lower than a certain level, the analysis server 210 may receive through an edge machine 220 sensor data (raw data) generated by a sensor 230 without using the load shedding method. When the load is higher than the certain level, the analysis server 210 may issue a data load shedding request (an offloading request for a specific operational module) to the edge machine 220 and may receive data obtained through preprocessing by the edge machine 220.

Figure 2:
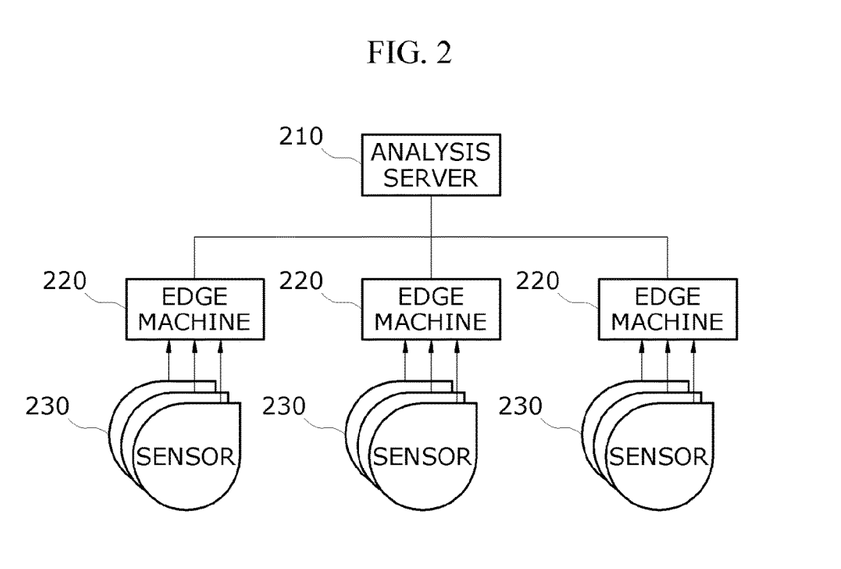
FIG. 2 is a block diagram of an edge-based load shedding system according to an embodiment of the present invention.

FIG. 2 is a block diagram of an edge-based load shedding system according to an embodiment of the present invention.

The load shedding system according to an embodiment of the present invention may include one or more analysis servers 210 that analyze data, one or more edge machines 220 that receive raw data from one or more sensors and transmit the intact raw data to the one or more analysis servers 210 or processes the raw data to transmit data obtained through the processing to the one or more analysis servers 210, and one or more sensors 230 that transmit the raw data to the one or more edge machines 220.

The raw data may denote data that are generated by the sensors 230 and are not processed. Preprocessing data may denote data that are obtained through processing by one or more specific operational modules and are transmitted to the analysis servers 210.

The analysis servers 210, the edge machines 220, and the sensors 230 may be connected to each other. The analysis servers 210 may be connected to the edge machines 220 through an Ethernet protocol based on IEEE 802.3 or a network based on IEEE 802.11 or lower compatibility thereof. The edge machines 220 may be connected to the sensors 230 over a sensor network based on IEEE 802.15.4. However, the scope of the present invention is not limited depending on the kind of a connected network protocol.

Here, the edge machines 220 may include various kinds of devices, which are capable of performing information processing, such as a portable phone, a personal computer (PC), a portable terminal, and/or the like. Also, the edge machines 220 may each use a device which is light and inexpensive like Raspberry Pi that collects data, performs a preprocessing operation on the collected data, and transmits data obtained through the preprocessing to an analysis server.

An edge demon executed by each of the edge machines 220 may receive the raw data from the sensors 230 and may transmit the intact raw data to the analysis servers 210 or may process the raw data to transmit data obtained through the processing to the analysis servers 210. In this sense, the edge machines 220 may each act as a gateway.

Figure 3:
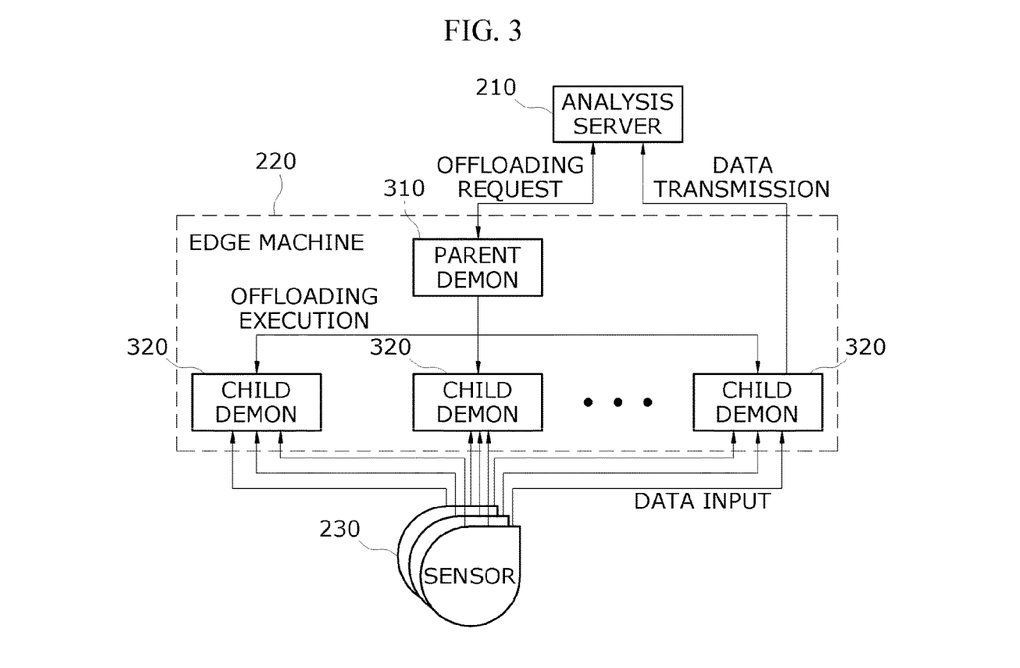
FIG. 3 is a block diagram for describing an operating method of a load shedding system based on offloading in an edge machine according to an embodiment of the present invention.

FIG. 3 is a block diagram for describing an operating method of a load shedding system based on offloading in an edge machine according to an embodiment of the present invention.

The edge machine 220 may execute the edge demon, and the edge demon may include a parent demon (a parent process) and a child demon (a child process).

One or more operations of an analysis process performed by the analysis server 210 may be performed by the edge machine 220 and may be referred to as offloading.

An offloading method may use (a) method that exchanges and processes a file (an input/output parameter mapping table) where information about an input parameter, information about an output parameter, and a specification for converting the input parameter into the output parameter are listed, (b) method that is a method where an edge machine receives an operational module corresponding to some of an analysis application from an analysis server and executes the operational module and is a method where an operator to be offloaded is offloaded into a child demon 320 while the child demon 320 is being executed, and (c) method that pauses execution of the child demon 320 and re-executes the child demon 320 along with an operational module which is to be offloaded.

A range where the (a) method is applied is narrow. The (c) method may be applied to various operational modules, but since a service is stopped while execution of the child demon 320 is stopped, an overhead is large. For this reason, the (b) method may use a method of loading an offloaded operational module into the child demon 320. However, depending on the case, an operational module cannot be offloaded by the (b) method, and in this case, the (c) method may be used.

Since a fast data system has a feature of processing a real time request which is very high in update rate and a feature of processing inaccurate and various unstructured data, the fast data system cannot previously define a type of raw data, and if a new sensor for generating unstructured raw data to be analyzed is added, an analysis application should be a posteriori corrected according to a type of corresponding raw data.

The principle is that raw data from a specific sensor is transmitted to an analysis server in a state where an analytic tool is equipped in the analysis server. However, the raw data may be transmitted to the analysis server in a state where the analytic tool is not equipped in the analysis server, and in this case, the analysis server may ignore the raw data.

If the analytic tool is a posteriori provided, one or more operations included in an analysis application of the analysis server for corresponding raw data may be offloaded into an edge machine. In a case of performing analysis on a sensor generating a new type of raw data, an offloading function may be useful as an adaptive analytic tool. In this manner, a method of functionally separating operations of the analysis server 210 and the edge machine 220 by offloading some operational modules into the edge machine 220 may be referred to as server/edge separation execution.

An edge demon of the edge machine 220 may include the parent demon 310 and the child demon 320. The parent demon 310 may execute the child demon 320 and may stop the execution. That is, the parent demon 310 may manage the child demon 320. The parent demon 310 may receive an offloaded operational module (an operational module which is included in the analysis application and is capable of offloading in the edge machine 220) from the analysis server and may store the received operational module. Also, the parent demon 310 may issue a request, to the child demon 320, to offload and execute the stored operational module. The parent demon 310 may store an offloaded operational module file at a predetermined position, thereby enabling the child demon 320 to access and offload an operational module which is to be offloaded. Also, the parent demon 310 may stop (kill process) the child demon 320 and may re-execute the child demon 320 in order for the child demon 320 to offload and execute the offloaded operational module.

Even in a case where input data and output data of the edge machine have a text type or a binary type, if mapping of a previously defined data structure is possible, a specific operation may be offloaded by exchanging a type of the input data, a type of the output data, and a matching definition file (an input/output data mapping table) of the input data and the output data. Such a function may intrinsically correspond to data offloading, but in simple data processing, it is possible to implement a function which is the same as a function of copying an operational module.

In this case, a type of input/output data may use a JSON type, a markup language, an SQL data type, and a user definition type, and the input/output data mapping table may be written in the type. Therefore, although operating systems (OSs) or use programs of the edge machine differ, since JSON or xml parser is a library which is fundamentally provided in most program languages, offloading may be performed in a field matching type.

The child demon 320 may be a multi-processor, or may be a multi-thread irrespective of a name thereof. Although one or more child demons are executed depending on a resource situation of the edge machine, all child demons may fundamentally perform the same function. An external sensor may input data to an arbitrary child demon executed by the edge machine connected thereto, and thus, in a case where offloaded operational modules differ, when the sensor 230 inputs raw data to a child demon into which an operational module is not offloaded, execution of an operational module can fail. Even when a desired operational module is not offloaded, a child demon may transmit intact input data to the analysis server. When an operational module is offloaded into a child demon, data may be preprocessed by using the offloaded operational module, and then, data obtained through the preprocessing may be transmitted to the analysis server.

Figure 4:
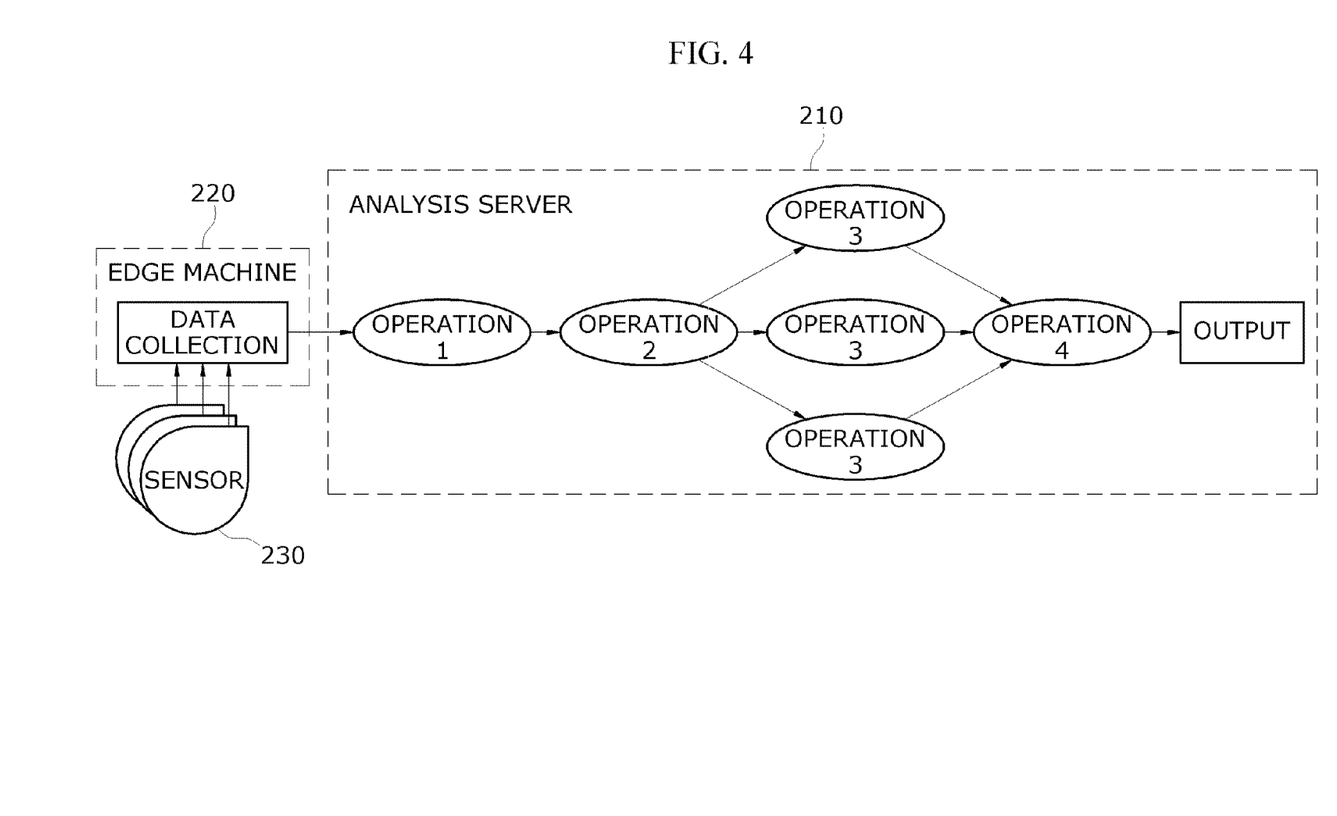
FIG. 4 is a structure diagram for describing an analysis operation of a load shedding system when offloading is not performed.

FIG. 4 is a structure diagram for describing an analysis operation of a load shedding system when offloading is not performed.

In FIG. 4, an edge machine may act as a gateway and may not have another function. Recently, devices which are light, inexpensive, and cost-effective like Raspberry Pi are being developed, and thus, the edge machine may sufficiently perform some of conventional functions provided from a server, in addition to a function of collecting and transmitting data.

An analysis server may output an analysis result by using a plurality of operational modules (operations 1 to 4). The analysis server in FIG. 4 may correspond to a case where server/edge separation execution is not performed, and the analysis server may calculate an analysis result value from raw data and may analyze data obtained through preprocessing by the edge machine. To this end, the analysis server may determine whether data received from the edge machine are the raw data or are the data obtained through the preprocessing, and when the intact raw data are received because an operational module is not offloaded, the analysis server may perform all operations performed by an analysis application.

Hereinafter, operations respectively performed by a plurality of operational modules will be described in detailed for example. In a case of analyzing raw data, input data may be a type such as "Warning: server is overloaded", "Error: server network connections are refused", "Error: too many connections", or "Warning: out of memory". In a case of performing analysis for knowing the number of errors associated with a network, for example, the operation 1 may be an operational module that segments log data by a word spacing unit, the operation 2 may be an operational module that extracts a sentence, where an error occurs in a first word, from among a plurality of sentences, the operation 3 may be an operational module that counts the number of words included in a sentence including "Error", and the operation 4 may be an operational module that sorts words, based on the number of words counted by the operation 3 and calculates the number of logs equal to the counted number of words. In this case, the analysis server may analyze list data in descending order of the number of words among error logs generated from sequential operations. Such analysis may all be performed by the analysis server, but some operations may be executed by the edge machine through separation. This will be described in more detail with reference to FIG. 5.

Figure 5:
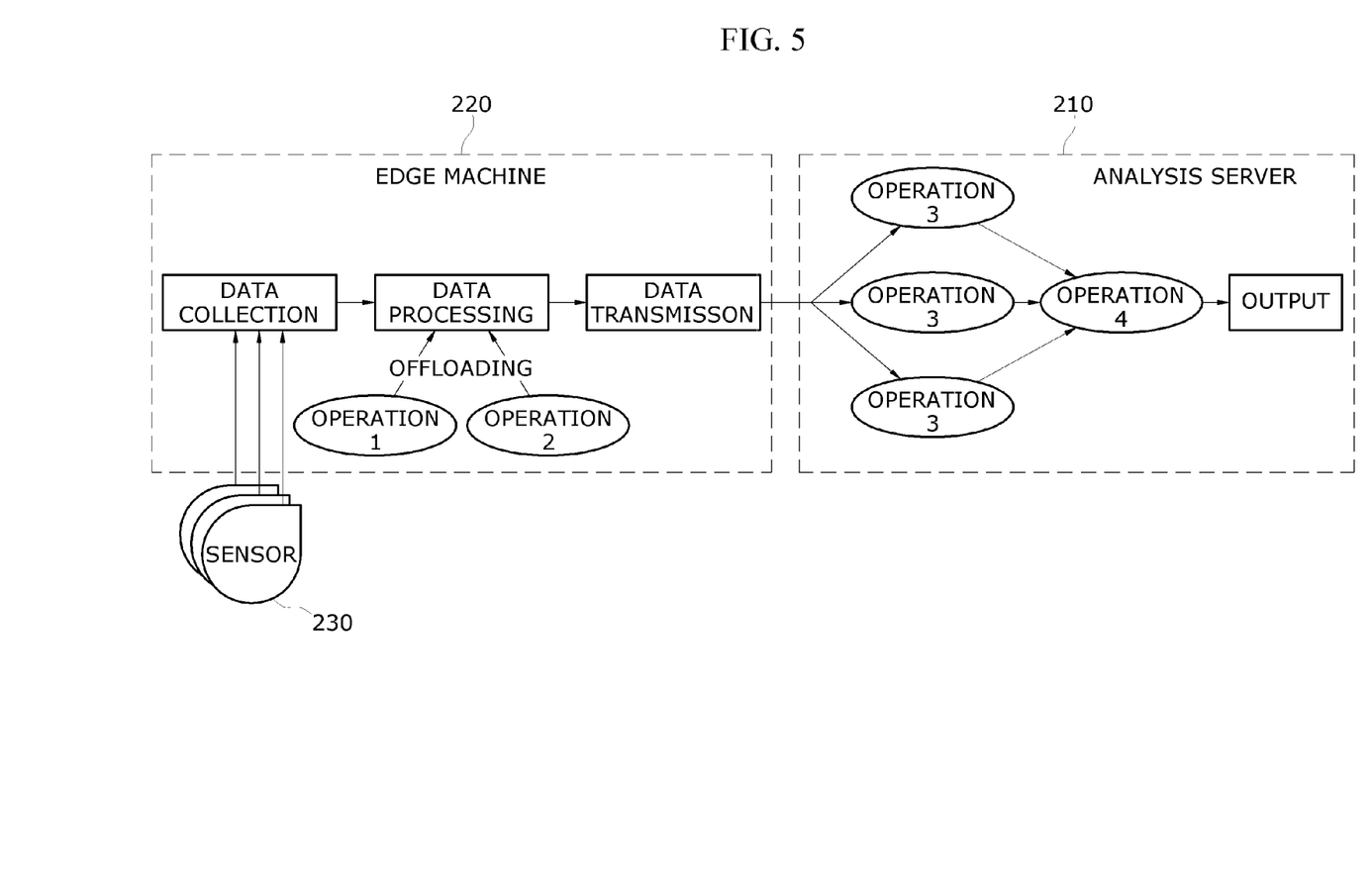
FIG. 5 is a block diagram for describing an operating method of a load shedding system based on offloading according to another embodiment of the present invention.

FIG. 5 is a block diagram for describing an operating method of a load shedding system based on offloading according to another embodiment of the present invention.

There is a large difference in that data are collected in FIG. 4, but in FIG. 5, the operation 1 and the operation 2 among the operational modules are executed in the edge machine 220, and the operation 3 and the operation 4 are executed in the analysis server 210. Such execution may be referred to as server/edge separation execution. Here, the operation 1 and the operation 2 may be operational modules capable of offloading, and the operation 3 and the operation 4 may be operational modules incapable of offloading.

If an input load of the analysis server is low, despite execution being performed as in FIG. 4, a stability of the analysis server is not greatly affected. However, if an input load is more than a certain level as described above with reference to FIG. 1, the analysis server 210 cannot normally operate, and thus, some operational modules of the analysis application of the analysis server 210 may be offloaded into the edge machine 220 and executed.

The analysis server may include one or more analysis applications, and each of the one or more analysis applications may include one or more operational modules. In the analysis server, one analysis application may store profile information about an operational module such as an order of execution of operational modules, the amount of resources necessary for execution of an operational module, information about an input parameter, information about an output parameter, and a mapping table of input/output parameters, and in a case where a specific operational module is offloaded into a specific edge machine, profile information about a corresponding operational module may be transmitted to the edge machine. Therefore, the edge machine may determine an order of execution of operational modules, a format of an input parameter of each of the operational modules, and a format of an output parameter of each operational module, based on the transmitted profile information.

The amount of the necessary resources may denote a value calculated based on a CPU use rate and a memory use rate which are necessary in executing an operational module, and the mapping table of the input/output parameters may denote a file where a specification for converting the input parameter into the output parameter is described. In some operational modules, an effect which is the same as offloading of an operational module is obtained by transmitting the mapping table to the edge machine.

The analysis server 210 may collect information about a current system. The analysis server 210 may collect information such as a specification (i.e., a CPU performance of the edge machine, a memory capacity, a storage space, etc.) of the edge machine, information such as a current load of the edge machine and whether a current operational module is offloaded, and information such as a traffic amount and a bandwidth of a network between the analysis server and the edge machine.

The analysis server may determine whether to offload an operational module into the edge machine, based on the collected information.

When the analysis server determines to offload the operational module into the edge machine, the analysis server may transmit a corresponding operational module to a corresponding edge machine, and the edge machine may store the transmitted operational module in a storage. When the analysis server requests offloading from the edge machine, the operational module may be offloaded into the edge machine, and the edge machine may preprocess input data by using the offloaded operational module.

Although the operational module is offloaded into the edge machine, the edge machine may not preprocess the input data by using the offloaded operational module. This is because in terms of a whole system, server/edge separation execution is not always efficient depending on a feature of the operational module and a system environment. However, since an offloading process is large in overhead, the operational module is merely offloaded, and the edge machine may determine whether to process data by using the offloaded operational module, based on conditions.

If a load of the edge machine is already high before offloading, resources of the edge machine may be determined as insufficient based on that a large amount of raw data are input from a sensor connected to the edge machine over a network and are transferred to the analysis server intactly, and thus, even when a specific operational module has been already offloaded, the offloaded operational module may not be used. However, in a case where a CPU load and a memory load of the edge machine are sufficient but a network use rate is high, if output data are smaller than input data due to the offloaded operational module, offloading may be requested. Whether the output data are smaller than the input data may be determined based on input parameter information and output parameter information.

A CPU and a memory of each edge machine are generally smaller in performance and capacity than the analysis server, but the edge machine 220 may be provided in plurality. Therefore, a load shedding (load reducing) function may be performed only by the edge machine 220 performing some functions of the analysis server 210.

In terms of distributing functions of the edge machine 220 and the analysis server 210, the load shedding system may be considered as a distributed processing system, there is a difference in that the edge machines offload different operators, but a plurality of edge machines may generally perform the same function.

The one or more edge machines 220 may be considered as a parallel processing system, and if there is an edge machine which is high in load, a whole load level of an edge machine is reduced by easily adding a low-cost edge machine.

It can be difficult to manage a plurality of edge machines, but the analysis server 210 may manage the edge machine by using offloading technology according to an embodiment of the present invention. Such management may be automatically performed depending on a situation of a system, and thus, a system is stably operated in addition to reducing burden where a user directly performs maintenance.

The analysis server may store desired resource information such as a CPU load and a memory load which are necessary when an operational module to be offloaded is being executed. The analysis server may generate the desired resource information, based on a value obtained through test and a performance of the edge machine and may receive desired resource information calculated by the edge machine to generate the desired resource information. When the edge machine periodically calculates desired resource information when executing an offloaded operational module and transfers the calculated desired resource information to the analysis server, the analysis server may update desired resource information stored therein, based on a weight value.

The desired resource information may be used to determine whether to perform offloading, by comparing residual resource information with desired resource information for offloading and executing a specific operational module when offloading the specific operational module into a specific edge machine.

In terms of system configuration, an operation of extracting specific information from all collected data may be an operational module incapable of offloading and may be performed by only the analysis server.

The edge machine 220 may offload and preprocess operational modules for previously processing data refinement, data extraction, and data verification. Since a preprocessing process is performed, a load of the analysis server is reduced, and data obtained through preprocessing by the edge machine may be small in capacity than input data. Since meaningless raw data in the preprocessing process are not transmitted to the analysis server, traffic is reduced in terms of a network.

To describe conditions of FIG. 5 for example, as in FIG. 4, input data may be a type such as "Warning: server is overloaded", "Error: server network connections are refused", "Error: too many connections", or "Warning: out of memory". In a case of performing analysis for knowing the number of errors associated with a network, for example, the operation 1 may be an operational module that segments log data by a word spacing unit, the operation 2 may be an operational module that extracts a sentence, where an error occurs in a first word, from among a plurality of sentences, the operation 3 may be an operational module that counts the number of words included in a sentence including "Error", and the operation 4 may be an operational module that sorts words, based on the number of words counted by the operation 3 and calculates the number of logs equal to the counted number of words. The operations 1 and 2 may be executed by the edge machine 220, but the operations 3 and 4 may be executed by the analysis server, and thus, server/edge separation execution may be performed. A result, obtained by analyzing list data in descending order of the number of words among error logs generated from sequential operations while reducing a load of the analysis server, is as illustrated in FIG. 4.

Figure 6:
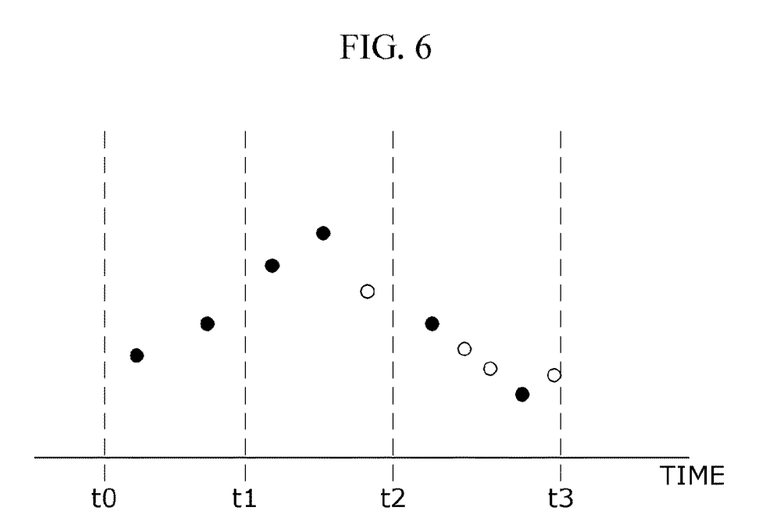
FIG. 6 is an exemplary diagram for describing a frequency number-based load shedding method.

FIG. 6 is an exemplary diagram for describing a frequency number-based load shedding method.

In methods associated with load shedding, the most general method may be a method based on sampling. A load may be reduced by a method that ignores an appropriate amount of input data based on a probability in consideration of a network bandwidth and resources of the analysis server. As illustrated in FIG. 6, the method may be a method that samples and processes only some of data generated at t0, t01, t02, and t03 by time. The edge machine 220 may collect data, and the analysis server may sequentially execute the operation 1, the operation 2, the operation 3, and the operation 4.

For example, in FIG. 6, if only two pieces of input data are to be analyzed in each time period due to a current load condition, a random generator may select two pieces of input data in each time period. If the number of data is equal to or less than two, all data may be selected. A probability of the random generator may be determined in order for about two pieces of data to be selected in a time period where there three or more pieces of input data. In this case, when two pieces of input data have been already selected, remaining data may be ignored, and if the number of remaining data is the same as the number of data to be selected, all of the remaining data may be selected, thereby enabling two pieces of input data to be selected. The number of input data to be selected may not be the same in all periods, and may be differently set based on a load situation of the analysis server.

In FIG. 6, black dots denote two pieces of input data which are selected in a corresponding period.

Figure 7:
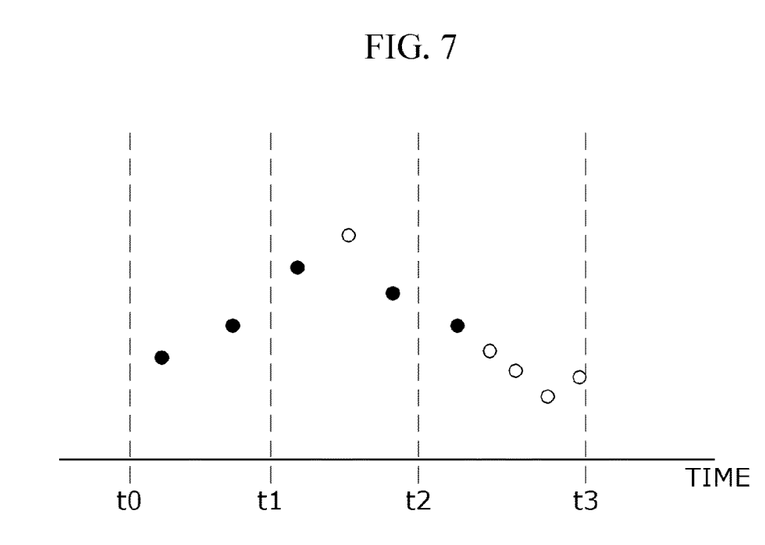
FIG. 7 is an exemplary diagram for describing a load shedding method based on offloading according to an embodiment of the present invention.

FIG. 7 is an exemplary diagram for describing a load shedding method based on offloading according to an embodiment of the present invention.

Input data which are the same as those in FIG. 6 will be described as an example. For example, in an operation of performing filtering in a range of a specific temperature, by offloading a corresponding operator into an edge demon, a load shedding operator may not perform sampling based on a random variable in each time period, and only data obtained through filtering by an offloaded operator may be transmitted to the analysis server. A load shedding result is obtained by a distributed processing method where the edge machine 220 executes some operations.

Considering FIG. 5, only processing data obtained by preprocessing only start raw data "Error" among all raw data may be transmitted to the analysis server, and thus, a load of the analysis server is reduced.

In FIG. 7, input data illustrated as black dots may denote data which are determined to be transmitted to the analysis server by the edge demon through filtering by an offloaded operator. In this case, transmitted data may differ, but a load shedding effect is similar.

In FIG. 6, input data arbitrarily selected based on a random variable are removed, but in FIG. 7, necessary data are all processed, and a load of the analysis server is reduced. Also, in FIG. 7, since a preprocessing process is performed by the edge machine, a load of the analysis server is reduced, and thus, the number of input data which are to be processed in each time period may be set higher than FIG. 6.

An offloaded operational module is limitly used to a relatively simple operation except large-scale data processing and data statistics calculation which are performed by the analysis server. The offloaded operational module may be easily applied to a preprocessing process such as data processing performed before an overall analysis of the analysis server.

Figure 8:
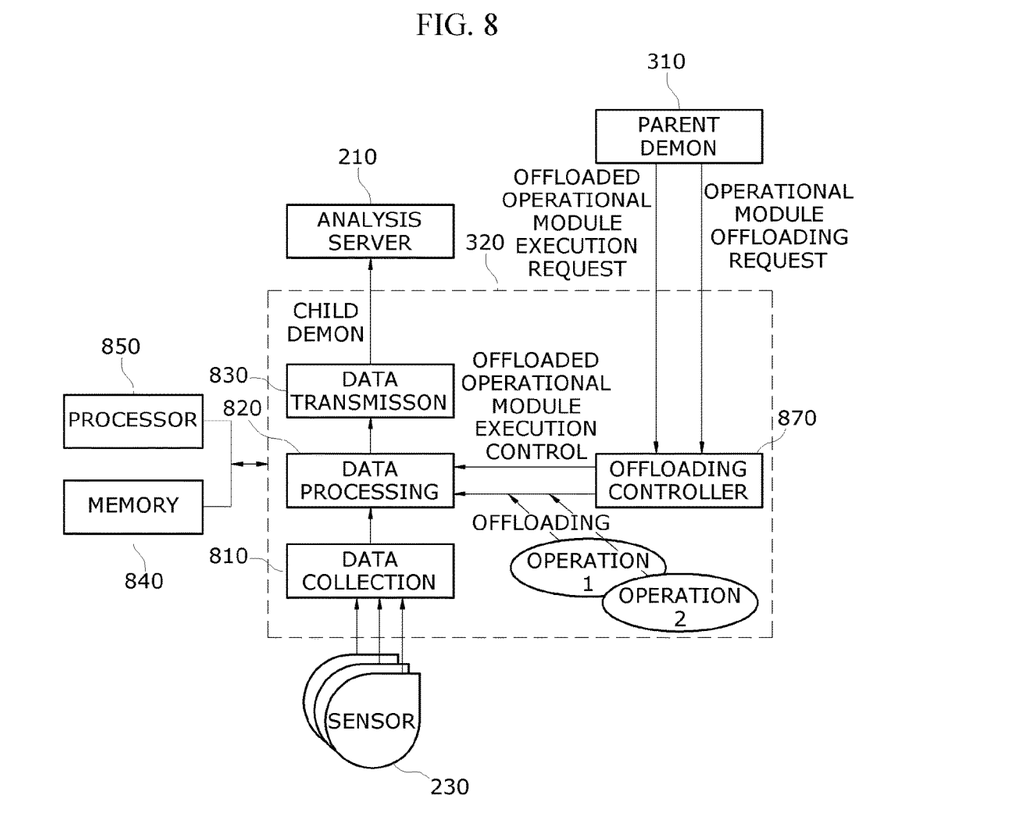
FIG. 8 is a block diagram for describing an offloading process in a child demon according to an embodiment of the present invention.

FIG. 8 is a block diagram for describing an offloading process in a child demon according to an embodiment of the present invention.

A child demon 320 may transmit collected intact data to an analysis server 210 without processing, or may receive an offloading execution command from a parent demon 310 to process the collected data by using an offloaded operator and may transmit data obtained through the processing to the analysis server 210.

A memory 840 may be shared by the child demon 320 in a shared memory type or a semaphore type. Such technology may be applied to the child demon 320 and the parent demon 310. Also a processor 850 may be used by the child demon 320 in executing some processes.

The child demon 320 may include a data collector 810, a data processor 820, and a data transmitter 830.

The data collector 810 may collect raw data from a sensor, and the data processor 820 may process raw data according to whether an operator is offloaded. The data transmitter 830 may transmit the data obtained through the processing to the analysis server 210.

The child demon 320 may further include an offloading controller 870.

The analysis server 210 may transmit an operational module, which is to be offloaded, to the parent demon 310. The analysis server 210 may issue an offloading request to the parent demon 310. In this case, the parent demon 310 may store the transmitted operational module, inform the child demon 320 of a location at which an offloading operational module is stored, and issue a request to the child demon 320 to offload a corresponding operational module (the operation 1 and the operation 2 in FIG. 5). When the child demon 320 offloads the corresponding operational module, the parent demon 310 may request execution of the offloaded operational module from the child demon 320, thereby allowing the child demon 320 to preprocess raw data in the data processor 820. The offloading controller 870 of the child demon 310 may offload the corresponding operational module, and thus, the data processor 820 may execute the corresponding operational module.

If it is unable to offload the corresponding operational module by using the offloading controller 870, the parent demon 310 may stop (kill) execution of the child demon 320 and may re-execute the child demon 320, thereby allowing the corresponding operational module to be offloaded.

The data transmitter 830 may transmit processing data (output data), obtained through preprocessing by the offloaded operational module, to the analysis server 210.

Figure 9A:
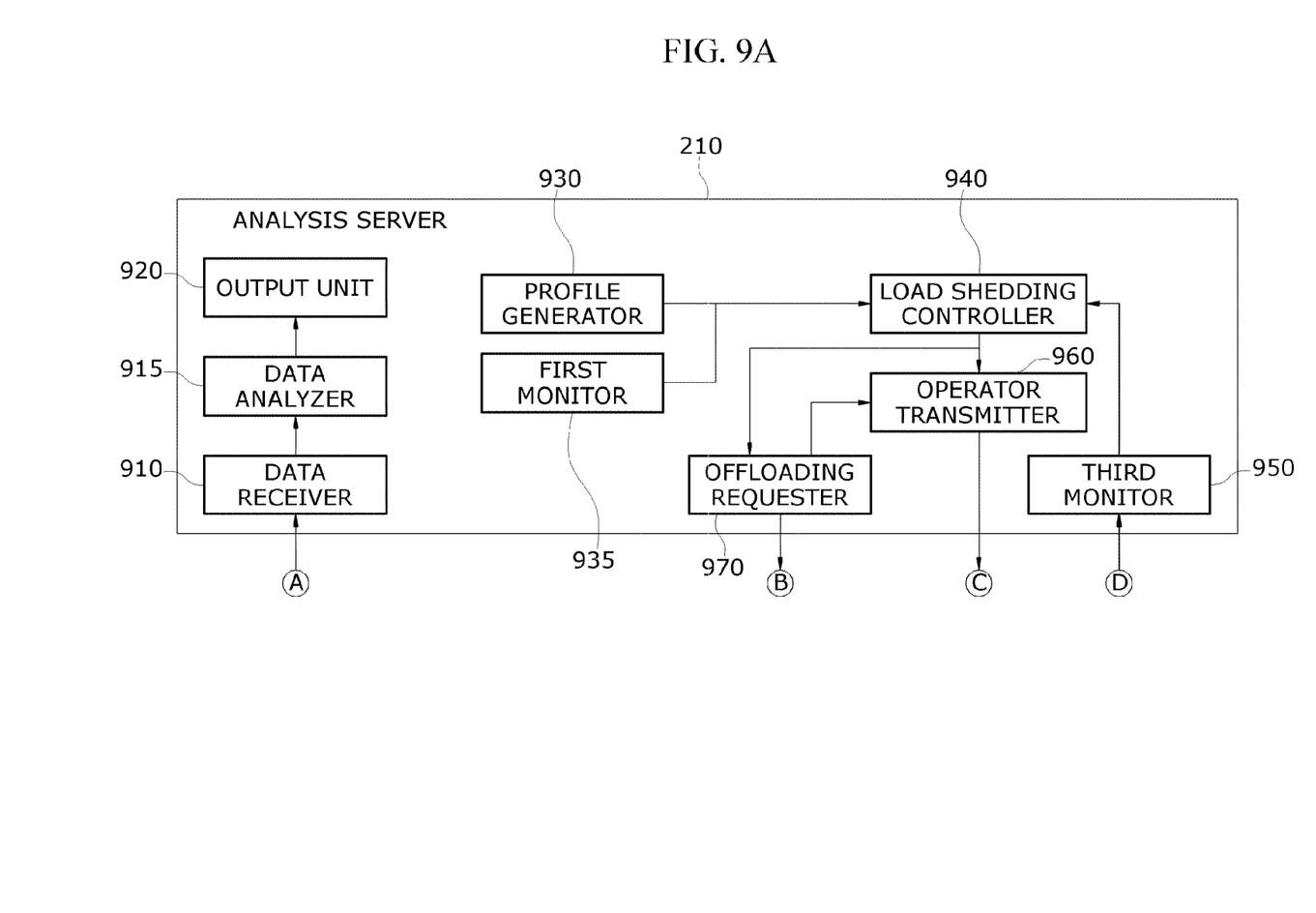
FIGS. 9A and 9B are block diagrams for describing a whole configuration of a load shedding system according to an embodiment of the present invention.
Figure 9B:
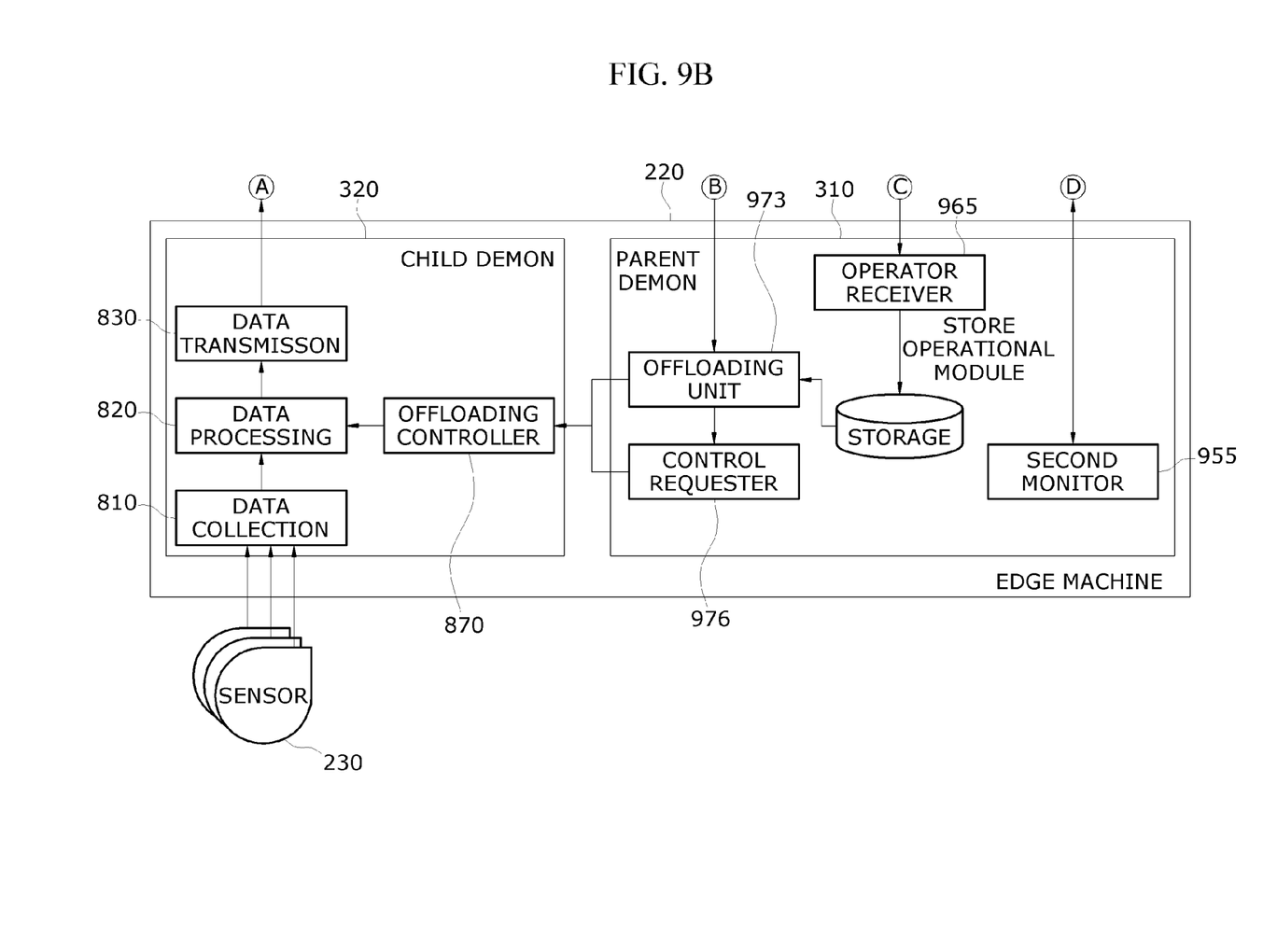

FIGS. 9A and 9B are block diagrams for describing a whole configuration of a load shedding system according to an embodiment of the present invention.

The data collector 810 of the child demon 320 may collect raw data generated from a sensor 230, and the data processor 820 may process the collected raw data. Then, the data transmitter 830 may transmit data obtained through the processing by the data processor 820 to the analysis server 210. A data receiver 910 of the analysis server 210 may receive the transmitted data, a data analyzer 915 may analyze the received data, and an output unit 920 may output the analyzed data.

A profile generator 930 of the analysis server 210 may generate a profile including information such as whether to enable offloading of an operational module, a desired resource amount, an execution time, input parameter information, output parameter information, and an input/output parameter mapping table, and a load shedding controller 940 may determine whether to perform load shedding, based on profile information.

A first monitor 935 may collect server resource information such as a CPU use rate, a memory use rate, network traffic, and a network bandwidth of the analysis server 210, and the load shedding controller 940 may determine whether to perform load shedding, based on the server resource information.

A third monitor 950 may receive state information and edge resource information such as a CPU performance, a CPU use rate, a memory capacity, and a memory use rate of each edge machine, the number of offloaded operators, and the number of connected sensors from a second monitor 955 of the edge machine 220, thereby allowing the load shedding controller 940 to determine whether to perform load shedding, based on resource information about edge machines located over a whole network.

In an embodiment of the present invention, that the load shedding controller 940 determines to perform load shedding denotes that the load shedding controller 940 offloads a specific operational module into a specific edge machine to determine to perform server/edge separation execution.

First, when an operator transmitter 960 transmits an operational module, which is to be offloaded, to an operator receiver 965 of the parent demon 310 executed in the edge machine 220, the operator receiver 965 may receive the transmitted operational module and may store the received operational module in a storage.

An offloading requester 970 may issue a request to an offloading unit 973 to offload the transmitted operational module. If a corresponding operational module is not received, the offloading requester 970 may not perform any operation, or may request retransmission of the corresponding operational module from the operator transmitter 960. In order to reduce a system overhead, the offloading requester 970 may not perform any operation until a new offloading request is received from the load shedding controller 940. When an operational module has been already offloaded, a control requester 976 may issue a request to the offloading controller 870 to process data by using the offloaded operational module.

After a corresponding operational module is transmitted, the offloading unit 973 may issue a request to the offloading controller 870 to actually offload the corresponding operational module to the data processor. Subsequently, the control requester 976 may issue a request to the offloading controller 870 to process data by using the offloaded operational module.

Figure 10:
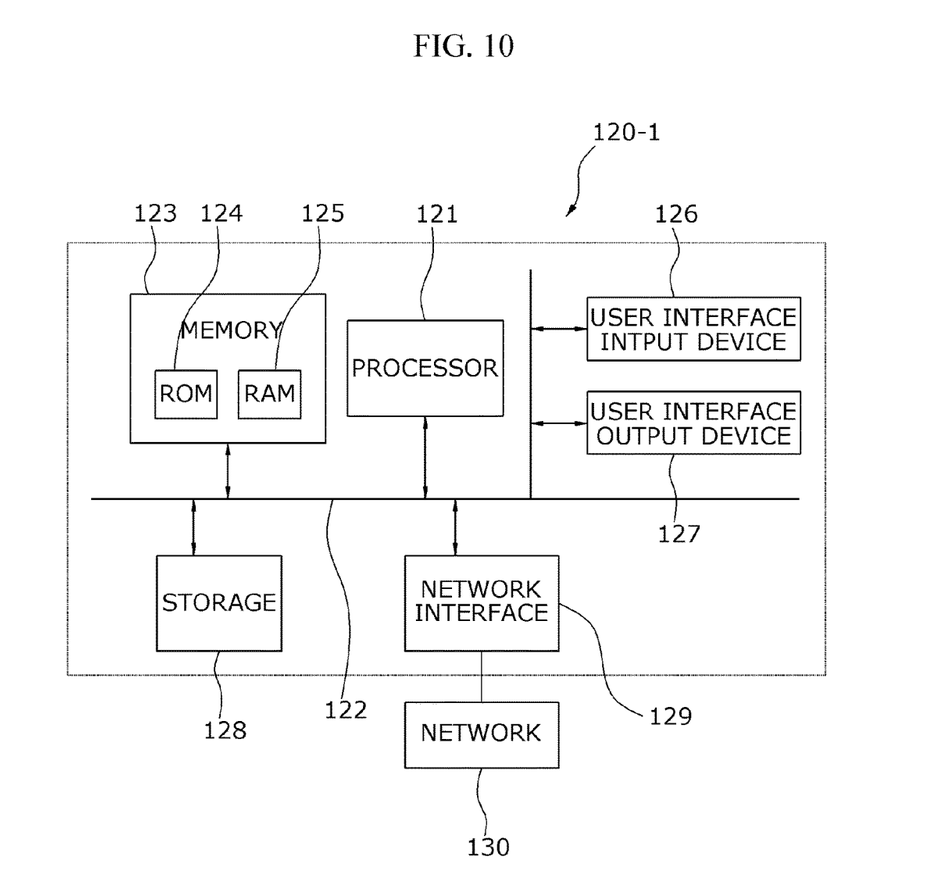
FIG. 10 is a block diagram of edge-based load shedding system according to an embodiment of the present invention.

An embodiment of the present invention may be implemented in a computer system, e.g., as a computer readable medium. As shown in FIG. 10, a computer system 120-1 may include one or more of a processor 121, a memory 123, a user input device 126, a user output device 127, and a storage 128, each of which communicates through a bus 122. The computer system 120-1 may also include a network interface 129 that is coupled to a network 130. The processor 121 may be a central processing unit (CPU) or a semiconductor device that executes processing instructions stored in the memory 123 and/or the storage 128. The memory 123 and the storage 128 may include various forms of volatile or non-volatile storage media. For example, the memory may include a read-only memory (ROM) 124 and a random access memory (RAM) 125.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

According to the embodiments of the present invention, since an edge machine distributes a load of an analysis server, a load shedding effect of the analysis server is obtained. Load balance is made based on current situations of the analysis server and the edge machine, thereby providing a more efficient system.

Moreover, according to the embodiments of the present invention, since a plurality of edge machines have characteristic of a parallel system, an edge machine is easily added or removed based on a load of a whole system. Also, with the recent advancement of technology, the cost-effectiveness of edge machines is enhanced, and thus, an economical system is implemented even without enlarging an analysis server system.

Moreover, according to the embodiments of the present invention, by using the offloading technology, each of a plurality of edge machines is efficiently managed by the analysis server instead of a receiver.

Moreover, according to the embodiments of the present invention, the load shedding method capable of server/edge separation execution based on operator offloading may perform server/edge collaboration data analysis unlike a conventional method in which a server mainly analyzes data, and various data generated from the IoT are more intelligently analyzed.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An edge-based load shedding system comprising:
    an analysis server configured to determine to perform server or edge separation execution, transmit an operational module of an analysis application, issue a request to offload the transmitted operational module, and receive and analyze data obtained through preprocessing; and
    an edge machine configured to receive and offload the operational module from the analysis server, preprocess raw data collected from a sensor by using the offloaded operational module, and transmit the data obtained through the preprocessing to the analysis server,
    wherein the analysis server determines to perform the server or edge separation execution based on profile information, and
    the profile information comprises an execution order and a desired resource amount of the operational module, input parameter information, and output parameter information.

2. The edge-based load shedding system of claim 1, wherein the analysis server determines to perform the server or edge separation execution, based on a central processing unit (CPU) use rate, a memory use rate, and network traffic.

3. The edge-based load shedding system of claim 1, wherein the analysis server determines to perform the server or edge separation execution, based on information about a central processing unit (CPU) use rate and a memory use rate of the edge machine received from one or more edge machines.

4. The edge-based load shedding system of claim 1, wherein the analysis application comprises an operational module capable of offloading and an operational module incapable of offloading.

5. The edge-based load shedding system of claim 1, wherein the edge machine comprises:
    a child daemon configured to control offloading of the operational module, collect and preprocess the raw data from the sensor, and transmit the data obtained through the preprocessing to the analysis server; and
    a parent daemon configured to monitor a central processing unit (CPU) use rate and a memory use rate of the edge machine to transmit monitoring information to the analysis server, receive and store the operational module from the analysis server, and issue a request to the child daemon to offload the operational module and preprocess the data.

6. An operating method of an edge-based load shedding system which includes an analysis server analyzing raw data preprocessed by the edge machine and one or more edge machines collecting and processing the raw data from a sensor to transmit data obtained through the processing to the analysis server, the operating method comprising:
    by the analysis server,
    (1) generating profile information about operational modules included in an analysis application;
    (2) collecting resource information and network information about the analysis server;
    (3) collecting resource information about the one or more edge machines;
    (4) determining to perform server or edge separation execution, based on the profile information, the resource information and the network information about the analysis server, and the resource information about the one or more edge machines;
    (5) determining edge machine for offloading and an operational module which is to be offloaded;
    (6) transmitting the operational module, which is to be offloaded, to the edge machine for offloading; and
    (7) issuing an offloading request to the edge machine for offloading,
    wherein the profile information comprises an execution order and a desired resource amount of the operational module, input parameter information, and output parameter information.

7. The operating method of claim 6, wherein the resource information about the analysis server comprises a central processing unit (CPU) use rate, a memory use rate, and network traffic.

8. The operating method of claim 6, wherein the desired resource amount is a value calculated based on a central processing unit (CPU) load, a memory load, and an execution time of the operation module which are necessary in executing the operational module in the edge machine.

9. The operating method of claim 6, further comprising:
    by the edge machine,
    (a) collecting the raw data from the sensor;
    (b) processing the collected raw data by using an offloaded operator;
    (c) transmitting data, obtained through the processing, to the analysis server;
    by the analysis server,
    (d) analyzing the transmitted data; and
    (e) outputting the analyzed data.

10. The operating method of claim 6, further comprising:
    by the edge machine, (1) monitoring information about a central processing unit (CPU) use rate and a memory use rate of the edge machine;
(2) receiving an operational module from the analysis server;
(3) storing the operational module in a storage;
(4) offloading the operational module stored in the storage; and
(5) requesting data processing based on the offloaded operational module.

11. An edge-based load shedding system comprising:

an analysis server configured to determine to perform server or edge separation execution, transmit an operational module of an analysis application, issue a request to offload the transmitted operational module, and receive and analyze data obtained through preprocessing; and an edge machine configured to receive and offload the operational module from the analysis server, preprocess raw data collected from a sensor by using the offloaded operational module, and transmit the data obtained through the preprocessing to the analysis server, a child daemon configured to control offloading of the operational module, collect and preprocess the raw data from the sensor, and transmit the data obtained through the preprocessing to the analysis server; and a parent daemon configured to monitor a central processing unit (CPU) use rate and a memory use rate of the edge machine to transmit monitoring information to the analysis server, receive and store the operational module from the analysis server, and issue a request to the child daemon to offload the operational module and preprocess the data.

* * * * *